United States Patent [19]

Shaw et al.

[11] Patent Number: 5,314,037
[45] Date of Patent: May 24, 1994

[54] AUTOMOBILE COLLISION AVOIDANCE SYSTEM

[76] Inventors: David C.-H. Shaw; Judy Z.-Z Shaw, both of 3312 E. Mandeville Pl., Orange, Calif. 92667

[21] Appl. No.: 8,367

[22] Filed: Jan. 22, 1993

[51] Int. Cl.$^5$ .................. B62D 1/24; B60T 7/16
[52] U.S. Cl. .................. 180/169; 340/903; 342/59; 342/71; 342/109; 364/426.04
[58] Field of Search .................. 180/169; 340/903; 342/59, 70, 71, 109; 364/426.01, 426.04

[56] References Cited

U.S. PATENT DOCUMENTS

| | | | |
|---|---|---|---|
| 4,072,945 | 2/1978 | Katsumata et al. | 342/70 |
| 4,168,499 | 9/1979 | Matsumara et al. | 342/71 X |
| 4,403,220 | 9/1983 | Donovan | 342/59 X |
| 4,552,456 | 11/1985 | Endo | 342/70 X |
| 4,626,850 | 12/1986 | Chey | 340/903 |
| 5,103,925 | 4/1992 | Imaseki et al. | 364/424.05 X |
| 5,162,794 | 11/1992 | Seith | 340/903 |
| 5,165,497 | 11/1992 | Chi | 180/169 |
| 5,177,462 | 1/1993 | Kajiwara | 180/169 X |
| 5,189,619 | 2/1993 | Adachi et al. | 364/426.04 |
| 5,203,422 | 4/1993 | Estep et al. | 180/169 |

Primary Examiner—Brian L. Johnson
Attorney, Agent, or Firm—S. Michael Bender

[57] ABSTRACT

An automobile collision avoidance system based on laser radars for aiding in avoidance of automobile collisions. The very small beam width, very small angular resolution and the highly directional character of laser radars provide a plurality of advantages as compared with microwave radars. With two sets of laser radars this system can detect the location, the direction of movement, the speed and the size of all obstacles specifically and precisely. This system includes laser radars with transmitters and receivers, a computer, a warning device and an optional automatic braking device. A steering wheel rotation sensor or a laser gyroscope is utilized to give information of system-equipped vehicle's directional change. The system will compare the predicted collision time with the minimal allowable time to determine the imminency of a collision. When the system determines that a situation likely to result in an accident exists, it provides a warning. An optional automatic braking device is disclosed to be used when the vehicle user fails to respond to a warning. Furthermore, a wheel skidding detecting system based on a discrepancy between the directional change rate predicted by a steering wheel rotation sensor and the actual directional change rate detected by a laser gyroscope is also disclosed. The detection of wheel skidding can be utilized by various vehicle control designs, including designs to adjust rear wheel steered angle in a four wheel steering vehicle, to alleviate or correct the wheel skidding. Designs to decelerate the engine or to adjust the transmission to lower gears are also disclosed to alleviate wheel skidding.

20 Claims, 6 Drawing Sheets

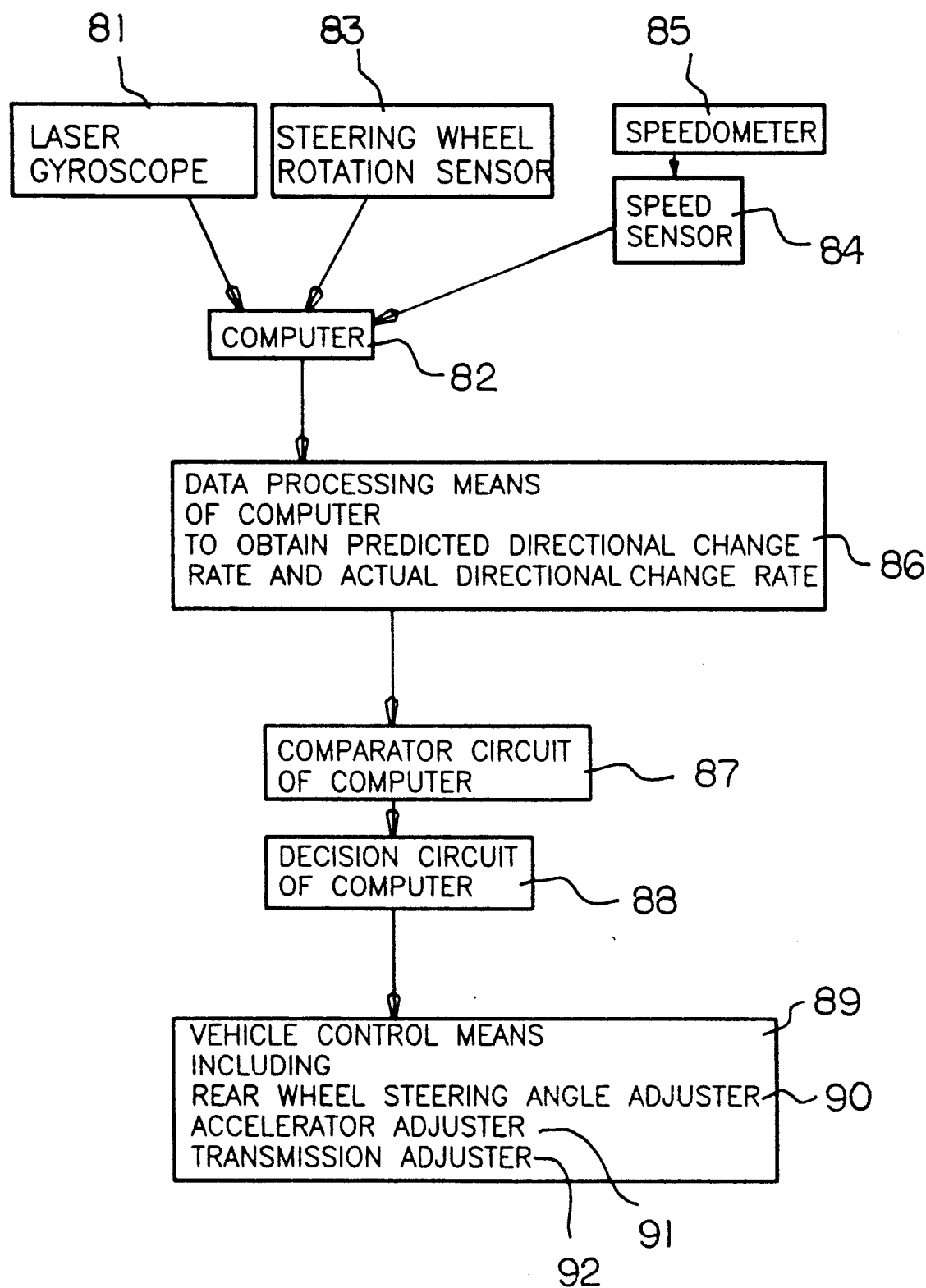

5,314,037

AUTOMOBILE COLLISION AVOIDANCE SYSTEM

TECHNICAL FIELD

The present invention relates generally to collision avoidance system and wheel skidding detection system for roadway vehicles, and more particularly, to the use of laser radars and laser gyroscope in aiding in the avoidance of vehicle collisions and to the use of laser gyroscope in detection of wheel skidding of vehicles.

BACKGROUND OF THIS INVENTION

This invention was the subject matter of Document Disclosure Program Registration numbers 310281, 312808 and 313901 which were filed in the United States Patent and Trademark Office on May 22, 1992, Jul. 8, 1992 and Jul. 23, 1992 respectively.

The use of radars in collision avoidance systems is generally known. U.S. Pat. No. 4,403,220 dated Sep. 6, 1983 discloses a radar system adapted to detect relative headings between aircraft or ships at sea and a detected object moving relative to the ground. The system is adapted to collision avoidance application. U.S. Pat. No. 4,072,945 dated Feb. 7, 1978 discloses a radar-operated collision avoidance system for roadway vehicles. The system senses the vehicle speed relative to an object and its distance and decides whether the vehicle is approaching the object at a dangerously high speed. A minimum allowable distance represented by a digital code is stored in a memory of a computer and the minimum allowable distance is compared with the distance sensed by the radar. U.S Pat. No. 4,626,850 dated Dec. 2, 1986 discloses a dual operational mode vehicle detection and collision avoidance apparatus using a single active or passive ultrasonic ranging device. The system is particularly adapted to scan the rear and the lateral sides of the motor vehicle to warn the vehicle user of any danger when changing lanes.

Most of the prior art collision avoidance systems use microwave radars as the ranging and detecting device. There are multiple disadvantages of these automobile collision avoidance systems when microwave radars are used. One major disadvantage is related to the beam width, that is the angular width of the main lobe of the radar, and the associated angular resolution of the microwave radar. The beam width is inversely proportional to the antenna diameter in wavelength. With the limitation of the antenna size, it is very difficult to make a reasonable size microwave radar with beam width less than 3 degrees. At the desired scanning distance, this beam width will scan an area which is much too big and thus is too nonspecific and difficult to differentiate the received echoes. Besides getting echo from another car in front of it, this radar will also receive echoes from roadside signs, trees or posts, or bridges overpassing an expressway. On highways with divided lanes the microwave radar will receive echoes from cars 2 or 3 lanes away and has difficulty to indifferentiating them from echoes coming from objects in the same lane. Because of the poor angular resolution of microwave radars, the direction of objects can not be specifically determined and objects too close to one another cannot be separated. The angular resolution of microwave radars is not small enough for them to be effectively used to monitor roadway traffic. The other disadvantage is that the microwave radars have difficulty in distinguishing radar signals coming from adjacent cars with similar equipment. If there are more than two cars with the same radar equipment on the same scene, the signals become very confusing.

The ultrasonic ranging and detecting device's angular resolution is also too poor to be effectively used in roadway traffic monitoring. The ultrasonic devices have even more difficulty than the microwave radars in determining the direction and location of echoes precisely, in the detection of directional change of objects and in avoiding signals coming from adjacent vehicles with similar equipment.

In the first, second and third preferred embodiments of this invention, laser radars are used in automobile collision avoidance systems to avoid the above disadvantages of microwave radars or ultrasonic devices.

In the prior art, there is no accurate way to predict when a collision may happen when dealing with a mobile obstacle, especially when the obstacle is moving in a direction different from the direction of the system-equipped vehicle. It is very important to be able to precisely predict a collision in order to give a proper warning as soon as possible and, meanwhile to avoid unnecessary warnings. In the first, second and third embodiments of this invention, novel ways to more precisely predict collisions are disclosed.

In U.S. Pat. No. 4,072,945 dated Feb. 7, 1978 Katsumata et al uses minimum allowable distance as the basis for their collision avoidance system. However, the concept of minimum allowable distance fails to take into consideration many other factors which influence the collision timing. In this invention a novel concept of minimum allowable time is disclosed. Minimum allowable time can be easily adjusted by other factors, including road condition, visibility, driver's physical and mental condition and other factors.

Furthermore, in the prior art there is no reliable way to get information from the system-equipped vehicle's directional change. In the third embodiment of this invention, a novel concept of utilizing a laser gyroscope to get very accurate information of directional change of the system-equipped vehicle is disclosed.

Wheel skidding is another important cause of vehicle collisions or accidents. The prior art is replete in roadway vehicles with four wheel steering capability with various designs to control the steering of rear wheels. It has been well known that steering the front wheels and rear wheels in the same direction also called coincidence-phase direction, at a high vehicle speed can promote the stability of the vehicle and decrease the possible lateral skidding of wheels caused by the centrifugal force during turning. Adjusting the rear wheel steering angle is used to prevent or correct wheel skidding.

U.S Pat. No. 5,103,925 dated Apr. 14, 1992 includes a rotational speed sensor for each wheel, wherein detection of difference in rotational speed between the front and rear wheels indicates presence of wheel skidding during turning. When wheel skidding is detected, a correction value is applied to modify the rear wheel steered angle. However, using the difference in rotating speed between the front wheels and the rear wheels as a basis for detecting wheel skidding will become inaccurate when wheel skidding occurs on wet roads or icy roads or when there is wheel locking due to excessive brake application. In the fourth embodiment of this invention a new and improved wheel skidding detecting system based on a laser gyroscope will be disclosed.

SUMMARY OF THE INVENTION

The present invention has been made to specifically address and improve the foregoing disadvantages and problems in the prior art. More particularly, in the present invention, laser radars are utilized as scanning and ranging devices. Laser radars have much smaller beam width and angular resolution and can give more specific and precise information of detected obstacle's direction, distance and relative speed. The data obtained by the laser radars are processed by a computer to obtain a predicted collision time.

This invention also utilizes novel concepts of minimal allowable time. The minimal allowable time is dependent on multiple factors, including the vehicle's speed, the obstacle's speed, the steered angle, the road condition, the light condition, the driver's condition and the obstacle's size. This invention includes various means to obtain data for all of these factors. This data is processed by the computer. The minimal allowable time is obtained by the computer either by specifically reading prestored memory matrices or by calculation with a multi-variable function. The memory matrices or the multi-variable functions are both based on the aforementioned multiple factors of influencing the minimal allowable time. When the predicted collision time is shorter than the minimal allowable time, the computer will generate warning signals to be sent to an alarm system and an optional automatic braking device.

In the first preferred embodiment of this invention, a single set of laser radars is utilized to detect any obstacle within a narrow scanning zone. The scanning zone is generally a narrow band of area directly in front of a system-equipped vehicle. For example, the scanning zone for one of the designs is the area within two parallel lines extending from the lateral sides of the system-equipped vehicle.

The second preferred embodiment is a much more advanced version of this invention as compared with the first embodiment. In the second embodiment, two laser radar sets are utilized, one set being mounted near the right end of the front side of a vehicle, and the other set being mounted near the left end of the front side of the vehicle. Each laser radar set has a scanning zone of 180 degrees. Based upon the difference of the measured relative speed components in the radial directions of the right and the left laser radar sets respectively, the exact relative speed and the direction of movement of any obstacle can be determined. Thus the precise courses of movement of the vehicle and all adjacent obstacles can be predicted, whereupon very reliable predicted collision time can be calculated for all obstacles within the very broad 180 degree scanning zone.

A steering wheel rotation sensor is utilized in the second embodiment to give the computer information about the system-equipped vehicle's direction of movement. However, the information generated by a steering wheel rotation sensor will be inaccurate when there is any significant wheel skidding, road tilting or unbalanced braking of the tires. In the third preferred embodiment, a laser gyroscope is utilized to detect the system-equipped vehicle's directional change. The direction information based on the laser gyroscope is much more reliable than that based on the steering wheel rotation sensor. The rest of the third embodiment is the same as the second embodiment.

In the fourth embodiment, a wheel skidding detecting system for a roadway vehicle based on a laser gyroscope and a steering wheel rotation sensor is disclosed. Any significant discrepancy between a predicted directional change rate, as obtained by the steering wheel rotation sensor, and an actual directional change rate, as obtained by the laser gyroscope, indicates a presence of wheel skidding. Various vehicle control designs can respond to wheel skidding signals to correct or alleviate the wheel skidding.

BRIEF DESCRIPTION OF THE DRAWINGS

These and other attributes of the invention will become more clear upon a thorough study of the following description of the preferred embodiments for carrying out the invention. Such description makes reference to the annexed drawings, wherein:

FIG. 12 is a block diagram of the fourth preferred embodiment of this invention.

DETAILED DESCRIPTION OF THE PREFERRED EMBODIMENTS

Figure 1:
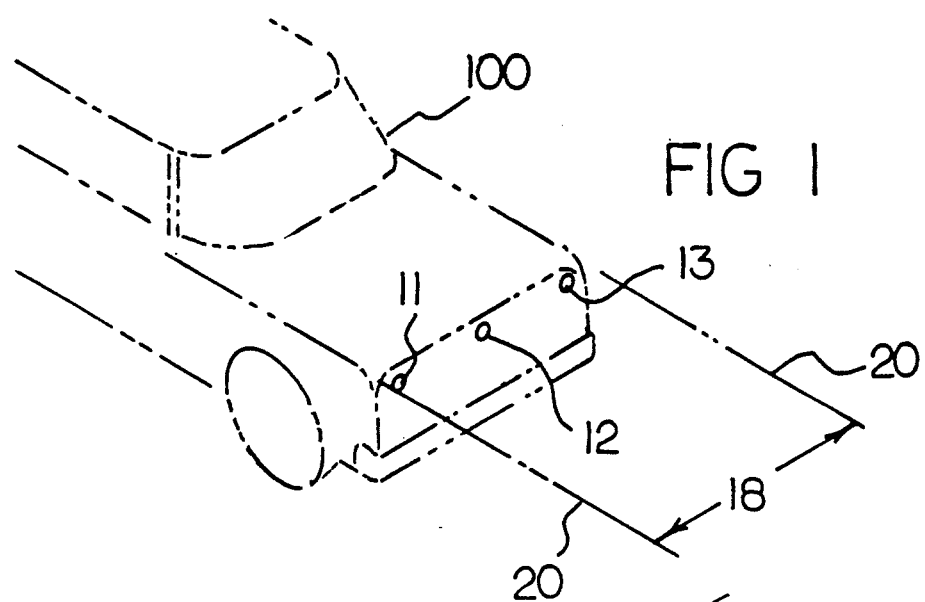
FIG. 1 is a view of an arrangement of the laser radar units in the first embodiment of this invention.

For a better understanding of the present invention and its operating advantages, laser radars and laser gyroscopes will be reviewed, followed by description of four preferred embodiments.

Review of Laser Radars

Radars have been used widely in detection of speed and distance of moving objects. Most radars use electromagnetic waves in the microwave frequency range. They are divided into pulse radars and continuous radars. In a pulse radar, the transmitter sends out radar signals through the antenna in pulses with extremely short duration, millionth of a second for example. The next pulse is emitted after the echoes have been received. The radars use doppler principle to calculate the speed by the amount of frequency shift. The doppler shift is caused by the targets moving toward or away from the radar in the radar's radial direction. Pulse radar can detect the speed and distance of a target. A simple continuous wave radar can give the speed information, but not the distance information. A frequency modulated continuous wave radar can detect both the speed and the distance.

The angular resolution of a radar depends on the beam width. If two targets are at about the same distance but at slightly different angles, they can be separated if they are more than one beam width apart. Ambiguity sometimes occurs due to reception of echoes from targets beyond the range of interest and of second-time-around echoes. This can be resolved by range gates which make radar insensitive to targets beyond the range of interest. The range ambiguity can also be resolved by filters that put limits on range.

Laser was invented in 1960. Laser light differs from ordinary light in a few areas. The most important difference is that laser light is highly directional. The laser light travels as parallel beam and spreads very little. It can travel in very narrow beams. Laser light is also electromagnetic waves. In comparison to microwave, laser light has higher frequency and shorter wavelength. Laser light can be used to measure speed and distance in the same way as the microwave radar. For example, YAG (crystalline yttrium aluminum garnet) laser and ruby laser have been used as range finders. The YAG can emit very efficient and useful laser in the near infrared at 1.06 micrometer wavelength.

Semiconductor junction lasers or diode lasers are very small, one millimeter or even smaller, typically emitting about 10 milliwatts of power and can be produced inexpensively. A light-weight laser radar sensory device has been developed for use in special canes for the blind, with two or three Gallium Arsenide lasers. It is low-powered and its safety has been proven for outdoor and indoor daily living usage. Gallium arsenide laser is one example of the semiconductor lasers. The semiconductor lasers are usually very small, less than one millimeter in any direction. They can be easily assembled into compact arrays of many units.

With heterostructure, gallium arsenide (GaAs) lasers can operate continuously in room temperature. The laser light can be modulated by varying the diode current. By alloying different proportions of two semiconductors, diode lasers can be fabricated to radiate at any wavelength from 0.64 to 32 micrometers. For example, the heterostructure of gallium indium arsenide phosphide sandwiched between layers of indium phosphide can radiate at 1.3 micrometers.

The laser beams are highly directional. The laser receiving equipment are also highly directional. Since the laser receiving equipment will receive only the laser beams aimed at it, most interference can be avoided. This is an important advantage over the microwave radar. When there are multiple cars with the same laser radars at the same scene, their reflected signals will not interfere with each other. Confusion can be easily avoided.

This invention will utilize laser radars in the first, second and third embodiments to detect the presence of any obstacle and the obstacle's location, distance, direction of movement and speed of movement.

Review of Laser Gyroscope

Laser gyroscope is the modern type of gyroscope with higher degree of accuracy, cheaper and much smaller than the traditional mechanical gyroscope. It can give directional information precisely. A typical laser gyroscope is made of glass-like material and is shaped like a triangle or a rectangle. A laser beam is generated and split into two parts that travel in opposite directions around the triangle or rectangle. Laser gyroscope has been used by airlines as automatic pilots to keep the airplanes on course. If the aircraft moves off course, the movement to one side will make one laser beam travel further than the other. Computer can analyze how much the laser beams are out of step and compute the plane's change in direction. Therefore, laser gyroscope can sense the rotation rate or direction change rate accurately.

This invention will utilize a laser gyroscope in the third embodiment to detect a system-equipped vehicle's directional change. In the fourth embodiment, a laser gyroscope will be utilized in a wheel skidding detecting system.

Before explaining the preferred embodiments of the invention in detail, it is to be understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the concept, upon which this disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

The First Preferred Embodiment

In the first preferred embodiment of this invention, at least one set of laser radar is mounted on the front side of a roadway vehicle. Each set consists of one or a plurality of laser radar units. Gallium arsenide lasers or other types of lasers may be used for the laser radar units for the present invention. Each laser radar unit has an accompanying transmitter and a receiver.

There are numerous ways to array the laser radar units on a roadway vehicle. FIG. 1 illustrates a vehicle (100) equipped with three laser radar units (11, 12, 13) mounted at the front side of the vehicle, one unit (11) being mounted near the right end of the front side of the vehicle, one unit (13) near the left end of the front side of the vehicle, and the other unit (12) near the middle of the front side of the vehicle. All of these three laser radar units are directed forward.

Figure 2:
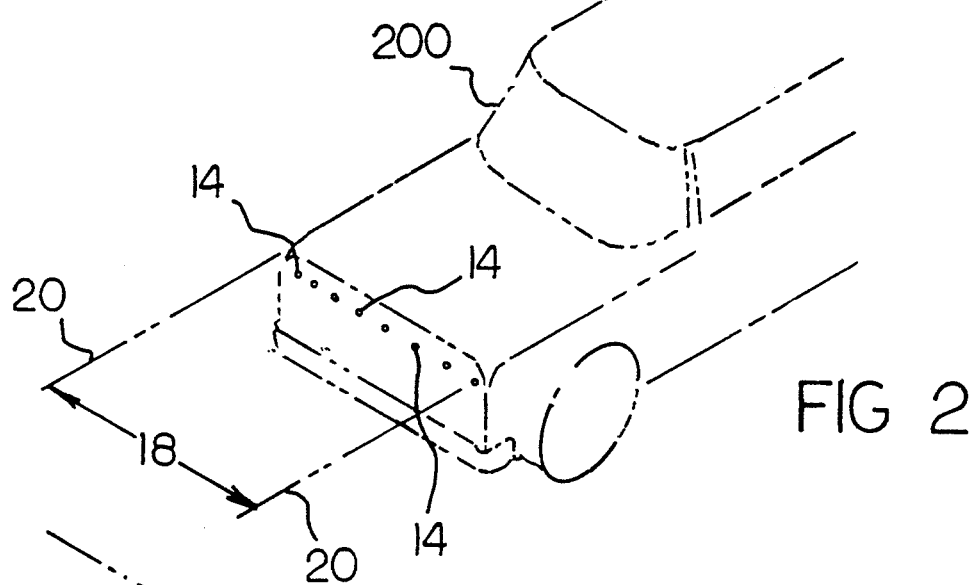
FIG. 2 is a view of an alternative arrangement of the laser radar units in the first embodiment of the present invention.

FIG. 2 illustrates a vehicle (200) equipped with a plurality of small laser radar units (14) horizontally arrayed evenly on the front side of the vehicle. The purpose of numerous small laser radar units closely arrayed together is to minimize the dead space within the scanning zone of the laser radars. Thus small obstacles in front of the vehicle can be detected.

Figure 3:
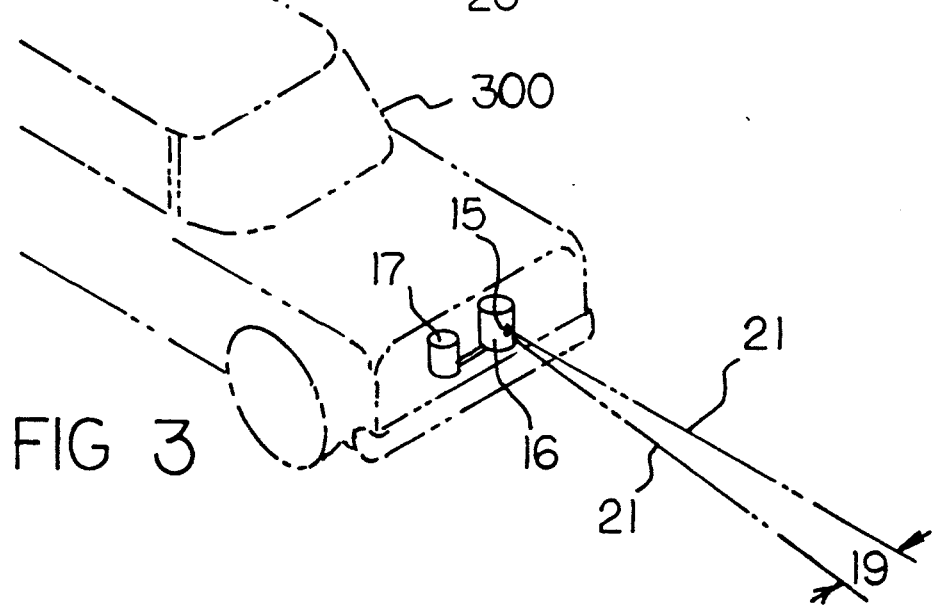
FIG. 3 is a view of another alternative arrangement of the laser radar units in the first embodiment of the present invention.

A laser radar unit can also be mounted on a rotatable structure which can be rotated to change the orientation of the laser radar unit. FIG. 3 illustrates a single laser radar unit (15) mounted on a cylindrical structure (16), wherein the cylindrical structure is mounted near the midpoint of the front side of a vehicle (300). The cylindrical structure can be rotated around its axis, said axis being perpendicular to to the ground. The cylindrical structure is functionally connected with an electric motor (17) which can rotate the cylindrical structure through a belt, gears or an axle (not shown) clockwise and counterclockwise, back and forth, through a small predetermined angle such that the laser radar can scan a narrow band of desirable scanning zone (19) in front of the system-equipped vehicle. Alternatively, the cylindrical structure (16) is rotated by the electric motor (17) in full circles in one direction, while the laser radar emits periodically. The laser radar will emit only when the laser radar is directed within the desirable scanning zone(19).

The scanning zone(18) for the FIG. 1 and FIG. 2 designs in the first embodiment is the area (18) in front of the vehicle within two parallel lines (20), each line being the extension of a line from the lateral side of the vehicle body. Whereas the scanning zone (19) for the FIG. 3 design of the first embodiment is the area (19) in front of the vehicle within two lines (21) which fan out with a very small angle from the midpoint of the vehicle's front side. Relatively narrow bands of scanning zone directly in front of the vehicle is preferable for the first embodiment to eliminate false positive warnings caused by roadside obstacles or obstacles in the adjacent traffic lanes. The scanning range is predetermined with a range gate or a filter.

It is well known that laser beams are highly directional. For example, a beam of ⅛ inch in diameter may, at most, spread to only 3 inches after traveling one mile. Because the laser beam is highly directional and the beam width is very narrow, the scanning zone in the first embodiment can be easily controlled and be highly specific and selective.

For this invention, laser radars which emit electromagnetic waves in the infrared range or the far infrared range will be utilized. Laser lights do not penetrate rain, sandstorm, fog or snow, etc. as well as microwave radar. However, infrared light will penetrate rain, sandstorm, fog or snow better than the visible light. Therefore, the rain or snow, etc. will affect the driver's vision much more than they affect the infrared laser radar. If the rain or snow etc. are heavy enough, they may reduce the effective range of the laser radar. In this situation, the driver's vision will be affected even more such that the driver should slow down the car speed. With reduced car speed, the reduced range of laser radar can still serve its function.

The laser radars will detect obstacles in front of the system-equipped vehicle within the selected scanning zone and scanning range. The laser radar will measure the distance and the relative speed in the radial direction of the laser radar beam between any obstacle and the system-equipped vehicle.

With highly directional character and with very small beam width, laser radars have other advantages as compared with microwave radars. The laser radar can easily avoid confusion caused by reflections from other laser radars in the vicinity. For microwave radars, reflected signals from adjacent vehicle with same or similar radar equipment can be received and become very confusing. Laser radars can avoid this disadvantage. The receiver of the laser radar is aimed at exactly the same direction as the associated transmitter. The receiver is also highly directional. The receiver will not receive the reflected back laser light emitted from other transmitters on the same vehicle or from transmitters on adjacent vehicles because ordinarily the other laser light reflection will come in a direction different from the receiver's direction, with the following two very rare and brief exceptions. The first exception is that confusion may occur when an oncoming vehicle's laser beam happen to aim at the system-equipped vehicle's receiver. In two moving cars this situation will last at most only a minimal fraction of a second. A second exception is that confusion may occur when an adjacent vehicle's laser beam happens to illuminate at the same spot as the spot illuminated by the system-equipped vehicle's laser beam. Then the reflected laser light from the adjacent vehicle may come in the right direction for the system-equipped vehicle's receiver. Again, this situation should be very rare and should last for an extremely short period of time. Since these two situations are extremely rare and very brief, confusion and interference from adjacent vehicle's similar laser radar equipment virtually will not be a problem for laser radars in this invention.

Figure 4:
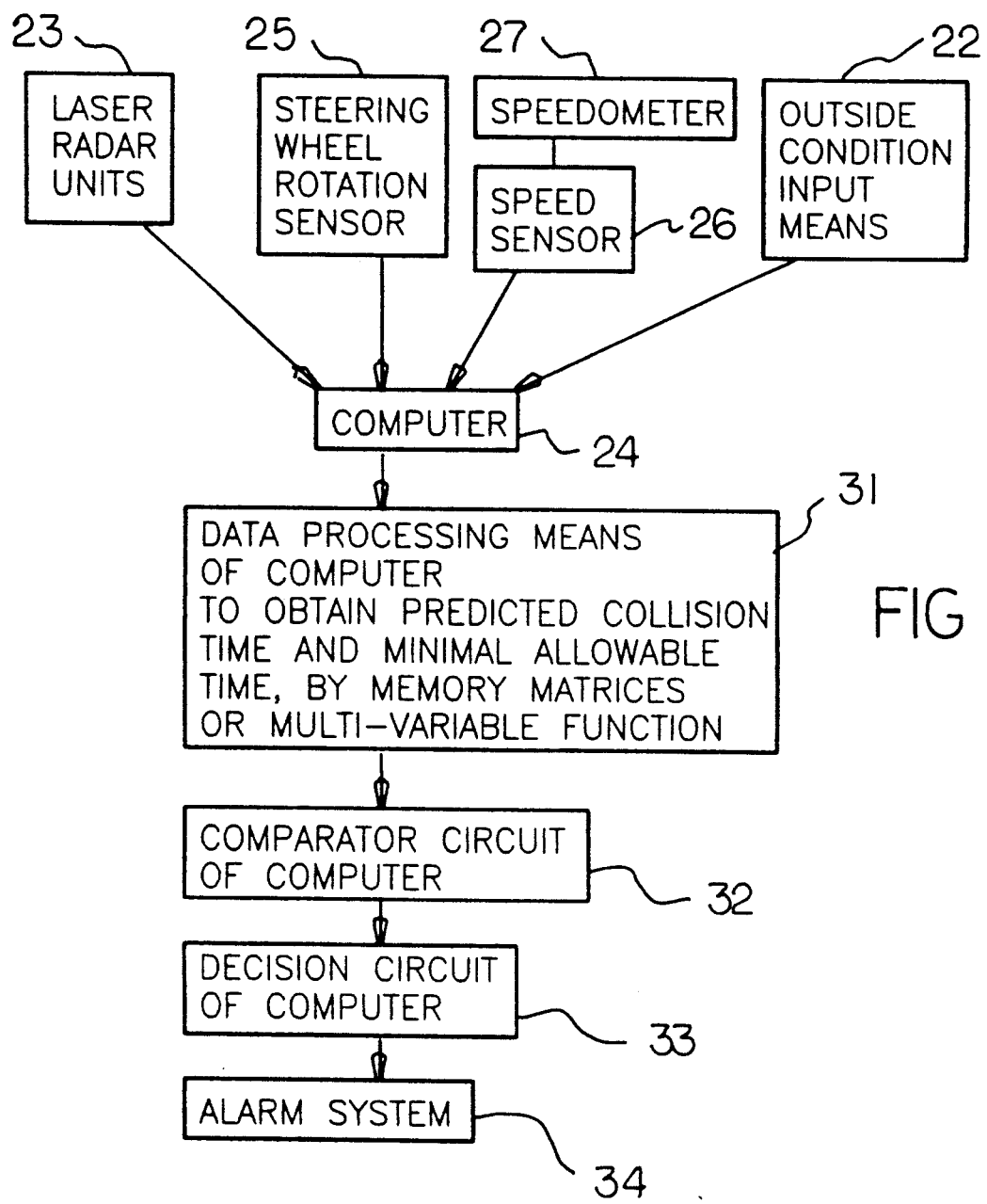
FIG. 4 is a block diagram of the first embodiment of this invention.

FIG. 4 illustrates a block diagram for the first embodiment of this invention. The one or a plurality of laser radar units (23) are all functionally connected with a computer (24). When any laser radar (23) detects any obstacle, the said laser radar will send electronic signals to the computer, said signals including the distance and the relative speed along the radial direction between the obstacle and the system-equipped vehicle. The computer (24) will process these signals to obtain a predicted collision time by dividing the said detected distance by the said detected relative speed as the following formula:

$$\text{Predicted Collision Time} = \frac{\text{Distance between vehicle and obstacle}}{\text{Relative speed between vehicle and obstacle}}$$

The predicted collision time refers to the timing when collision will occur if the relative speed between the obstacle and the vehicle is unchanged.

The computer (24) uses prestored memory matrices or formulas to obtain a minimal allowable time. The minimal allowable time depends on multiple factors, including the relative speed, the vehicle's speed, the degree of steered angle, road condition, day or night light, and driver's condition. The road condition refers to dry road, wet road, snowy or icy road. Paved or unpaved road is also a factor but, for simplicity, will not be discussed hereto. The driver's condition refers to driver's responsiveness, brisk or sluggish, and is related to the driver's age, health, sex and other personal characters. The minimal allowable time can either by prestored in multiple memory matrices or be calculated by using a multi-variable function "f":

$$T_{v,u,a,r,l,d} = f(V, U, A, R, L, D)$$

wherein "T" is the minimal allowable time; "V" represents the system-equipped vehicle's speed as obtained from a speedometer; "U" represents obstacle's relative speed in the radial direction as detected by the laser radar; "A" represents degree of steered angle; "R" represents road condition; "L" represents day or night light; and "D" represents driver's condition. Other pertinent variables may also be incorporated into the aforementioned function "f". The exact formula of the multi-variable function "f" depends on the model of the vehicle and the type of brakes and tires used.

Furthermore, a plurality of safety levels may be selected in association with the minimal allowable time, for example, a disastrous level minimal allowable time, a critical level minimal allowable time, and a warning level minimal allowable time. The disastrous level minimal allowable time is the time obtained by calculation with the multi-variable function "f" or by specifically reading from multiple memory matrices. The critical level minimal allowable time is the sum of disastrous level minimal allowable time plus a first predetermined time, while the warning level minimal allowable time is the sum of the critical level minimal allowable time plus a second predetermined time.

Referring back to FIG. 4, a steering wheel rotation sensor (25) is functionally connected with the computer (24). Said steering wheel rotation sensor (25) can send electronic signals about the steered angle to the computer (24). A speed sensor (26) is functionally connected with the vehicle's speedometer (27), and the said speed sensor (26) is also functionally connected with the computer (24). The speed sensor (26) can convert the speed information from the speedometer into electronic signals and send the signals to the computer (24).

Figure 5:
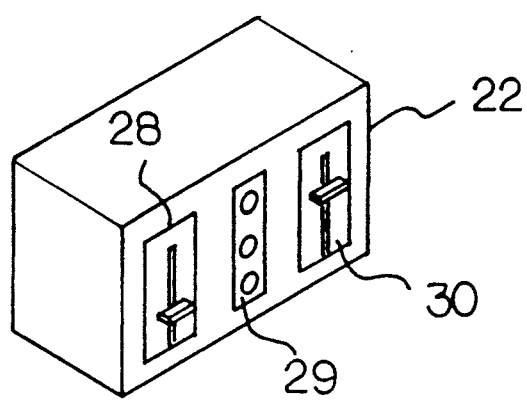
FIG. 5 illustrates an outside condition input means with a plurality of selectors, each for one outside condition, to be utilized in the first, the second and the third embodiments.

As illustrated in FIGS. 4 and 5, an outside condition input means (22) is also functionally connected with the computer (24). Said outside condition input means (22) includes a plurality of selectors, each selector for one outside condition, including a road condition selector (28), a day or night light selector (29), and a driver's condition selector (30). Each selector consists of either a selection scale or selection buttons. The vehicle user can manually move the road condition selection scale or push the selection buttons to match the ongoing road condition. Similarly, the vehicle user can manually choose the light condition selector (29) to match the current visibility; and choose the driver's condition selector (30) to match the driver's current physical and mental condition.

For simplicity, the day or night light selector (29) may be substituted by an automatic design by connecting a branch circuit from the vehicle's headlight circuit to the computer (24). Thus when the headlight is on, the computer (24) will receive a signal from the said branch circuit to automatically select the night light condition; whereas when the headlight is off the computer will automatically select the day light condition. Similarly, the road condition selector may be simplified by a branch circuit from the vehicle's windshield wiper circuit to the computer such that when the windshield wiper is turned on the computer will automatically receive a signal to select the wet road condition.

Thus the computer (24) will receive input data regarding all of the pertinent variables "V", "U", "A", "R", "L", "D". The computer includes data processing means (31) to process these input data, either through reading of the memory matrices or through calculation with the multi-variable function "f" to obtain the minimal allowable time. Through a comparator circuit (32) of the computer, the computer can compare the predicted collision time with the minimal allowable time and generate a signal for the comparison result and send the signal to a decision circuit (33) of the computer. When the predicted collision time is shorter than the minimal allowable time, a commanding signal will be sent by the decision circuit (33) of the computer to an alarm system (34) to actuate an audible and/or visible alarm to warn the vehicle user.

Different levels of audible and/or visible alarm may be adapted when a plurality of safety levels are adapted in association with the minimal allowable time. For example, when the predicted collision time is shorter than the disastrous level minimal allowable time, an uppermost degree of alarm will be actuated. When the predicted collision time is shorter than the critical level minimal allowable time, a less serious degree of alarm will be actuated. When the predicted collision time is shorter than the warning level minimal allowable time, a further less serious degree of alarm will be actuated.

The laser radars in the first embodiment are arrayed in such ways that the laser radars will scan narrow bands in a scanning zone directly in front of the vehicle. The relative speed information obtained by a single laser radar or laser radars with parallel beams includes only the speed component in the radial direction of the laser beams. Thus the first embodiment will function very well when dealing with an obstacle directly in front of the system-equipped vehicle and the obstacle is moving either in the same or the opposite direction as the vehicle's 30 direction. However, the first embodiment's function is located in front of the vehicle and is moving in a direction out of the vehicle's course of movement. The obstacle may be detected by the laser radar and cause an unnecessary alarm. The unnecessary alarm will be brief and cease after the obstacle has moved out of the vehicle's laser radar scanning zone. The first embodiment's function will also be partially limited when dealing with an obstacle which suddenly moved into the system-equipped vehicle's laser radar scanning zone within a very short distance. This will cause a precipitated alarm. An uppermost degree of alarm may be reached suddenly without going through earlier stages of less serious degrees of alarm. When faced with a precipitated alarm, the vehicle user may not have enough time to prevent a collision from happening. However, even a precipitated alarm is still much better than no warning at all. It is well known that a slightly sooner response from the driver, even only half a second sooner, will greatly decrease the severity of a car accident.

Besides at least one laser radar unit being mounted on the front side of a vehicle as described hereto, the first embodiment may be expanded to include at least one laser radar unit being mounted on the rear side, the right side or the left side of the vehicle to warn the vehicle user about probable collisions with obstacles coming from the rear, the right or the left of the vehicle in accordance with the teachings of the present invention.

The advantage of the first embodiment is that it requires much less sophisticated computer and will cost less as compared with the second and the third preferred embodiments of this invention, to be described hereafter.

The Second Preferred Embodiment

The second preferred embodiment is designed to overcome the above limitations of the first embodiment by broadening the scanning zone for the laser radars, using at least two sets of laser radars and using more sophisticated computer to detect the movement direction of obstacles, the relative speed of obstacles including the radial speed component and nonradial speed component, and to predict the courses of movement of the vehicle and obstacles in the near future.

Figure 6:
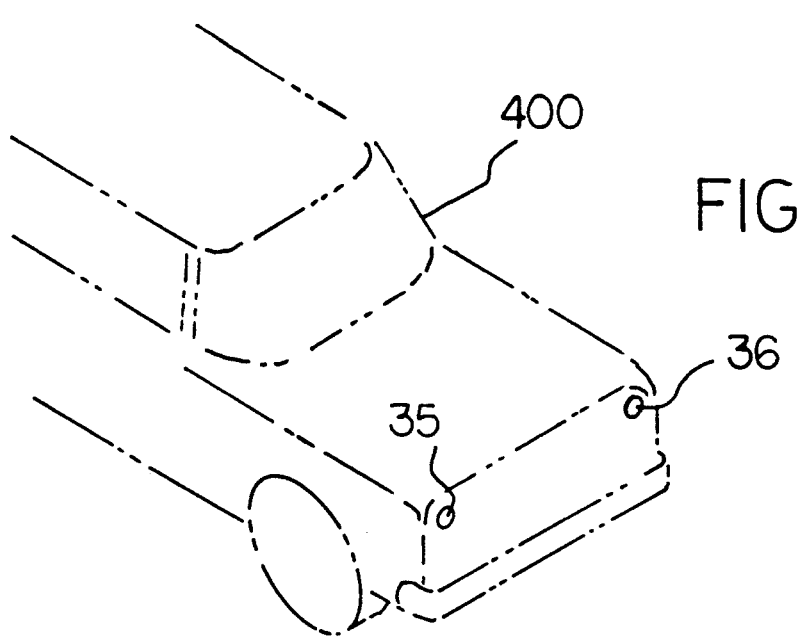
FIG. 6 is a view of an arrangement for two laser radar sets utilized in the second embodiment of the present invention.
Figure 7:
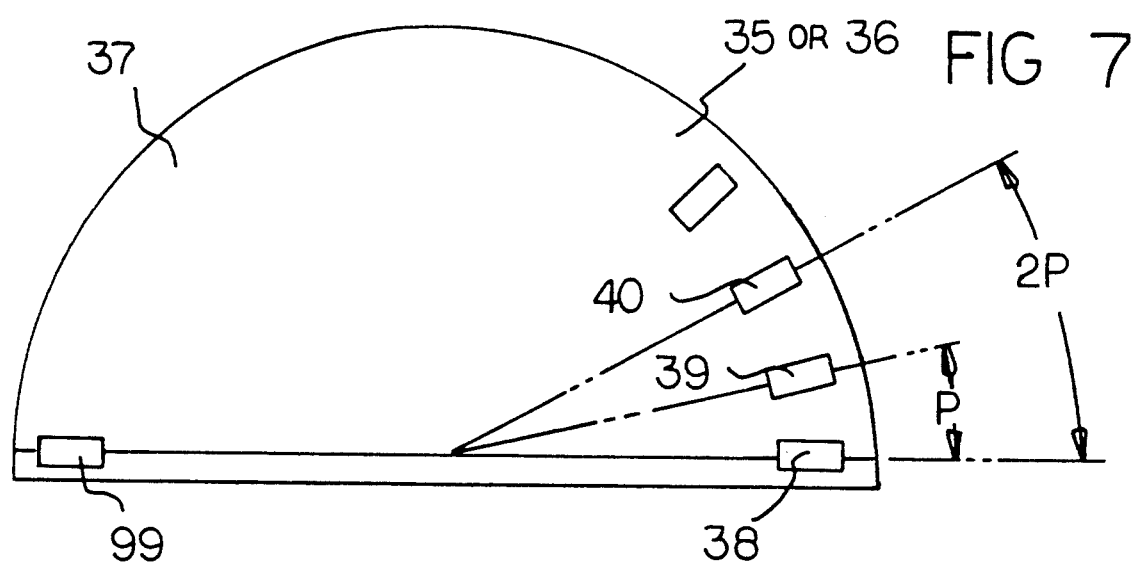
FIG. 7 illustrates one design of a laser radar set in the second embodiment of this invention, wherein a plurality of laser radar units are evenly separated and arrayed on a semicircular disc, with the first laser radar unit directed at 0 degree, the second laser radar unit directed at p degrees, and the third unit directed at 2p degrees and so forth.

As illustrated in FIG. 6, the second embodiment includes two laser radar sets (35, 36), one set (35) being mounted near the right end of the front side of a system-equipped vehicle (400), and the other set (36) being mounted near the left end of the front side of the vehicle (400). Each set of laser radars includes a plurality of laser radar units evenly separated and arrayed on a semicircular disc (37), as illustrated in FIG. 7. The first laser radar (38) is aiming at zero degree direction; the second laser radar (39) is aiming at "p" degree direction; the third laser radar (40) is aiming at "2p" degree direction; and so forth; while the "n"th laser radar is aiming at "np" degree direction, "np" being equal to 180 degree direction. Thus each laser radar set can scan 180 degree semicircular zone in front of the vehicle. The radius of the said semicircular scanning zone is the range of each laser radar unit. The range of the laser radar unit is preselected by a range gate or a filter as described under the first embodiment.

An angle encoder is functionally connected with each laser radar unit. The angle encoder will generate a directional signal corresponding to each laser radar's direction. When a laser radar unit receives a reflection from an obstacle, the said laser radar unit's direction is the same as the direction of location of the said obstacle. Thus the electronic signals generated by each laser radar unit are coupled with the signal from the associated angle encoder to generate an output signal including the obstacle's distance, relative speed in the radial direction and the direction of location.

Figure 8:
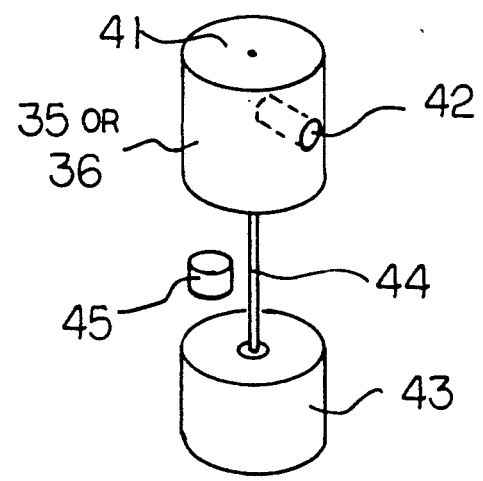
FIG. 8 illustrates an alternative design of a laser radar set in the second embodiment, wherein a single laser radar unit is mounted on a cylindrical structure rotatable through at least 180 degrees.

FIG. 8 illustrates an alternative design of a laser radar set, wherein each of the two laser radar sets includes only one laser radar unit (42) mounted on a cylindrical rotator (41). The cylindrical rotator (41) is functionally connected with an electric motor (43) through a belt, gears, axle (44) or other connecting devices. The cylindrical rotator (41) can be rotated around the cylinder axis clockwise and counterclockwise, back and forth, through 180 degree scanning zone. Alternatively, the cylindrical rotator (41) is rotated by an electric motor (43) in full circles in one direction, while the laser radar (42) emits periodically such that the laser radar will emit only when the laser radar's direction is within the 180 degree scanning zone. The laser radar will emit pulse laser beams intermittently, numerous times per second with known intervals such that the laser radar can scan the 180 degree scanning zone at predetermined angular intervals. An angle sensor (45) is functionally connected with the cylindrical rotator to generate directional signal. The electronic signals generated by the laser radar are time processed along with the said directional signal to generate an output signal including the obstacle's distance, relative speed in the radial direction and direction of location of the obstacle.

Except for very small obstacles, one or more than one laser radar beams from the right laser radar set may be reflected back by an obstacle. When there are more than one laser radar beams reflected by a same obstacle, the laser beams will detect same or slightly different distances and slightly different speeds due to different angles. When more than one laser beams are reflected back from a same obstacle, the computer will select the laser radar beam which detect the shortest distance as the representative laser beam and the shortest distance as the representative distance; and the relative speed and direction of the obstacle as detected by the said representative laser radar beam as the representative relative speed and representative direction, as measured by the right laser radar set. When only one laser beam is reflected by an obstacle, the computer will use this laser radar beam as the representative laser beam. Similarly, when more than one laser beams from the left laser radar set are reflected by a same obstacle, the computer will select representative laser beam, and the associated representative distance, direction and relative speed, as measured by the left laser radar set.

When a system-equipped vehicle and an obstacle are both moving along an imaginary line which connects the vehicle and the obstacle, the representative relative speed as measured by the right laser radar set will be virtually the same as the representative relative speed as measured by the left laser radar set.

When either the system-equipped vehicle or the obstacle is not moving along the imaginary line connecting them, the representative relative speed as measured by the right laser radar set will be different from the representative relative speed as measured by the left laser radar set because each laser radar set measures a component of the relative speed along its own radial direction. Since the right laser set and the left laser set are separated by a known distance (several feet), with geometric and trigonometric principles, the computer can use the above difference in measured representative relative speeds to calculate the direction of movement of the obstacle and the relative speed of the obstacle as relative to the vehicle, including the radial speed component and the nonradial speed component.

Figure 9:
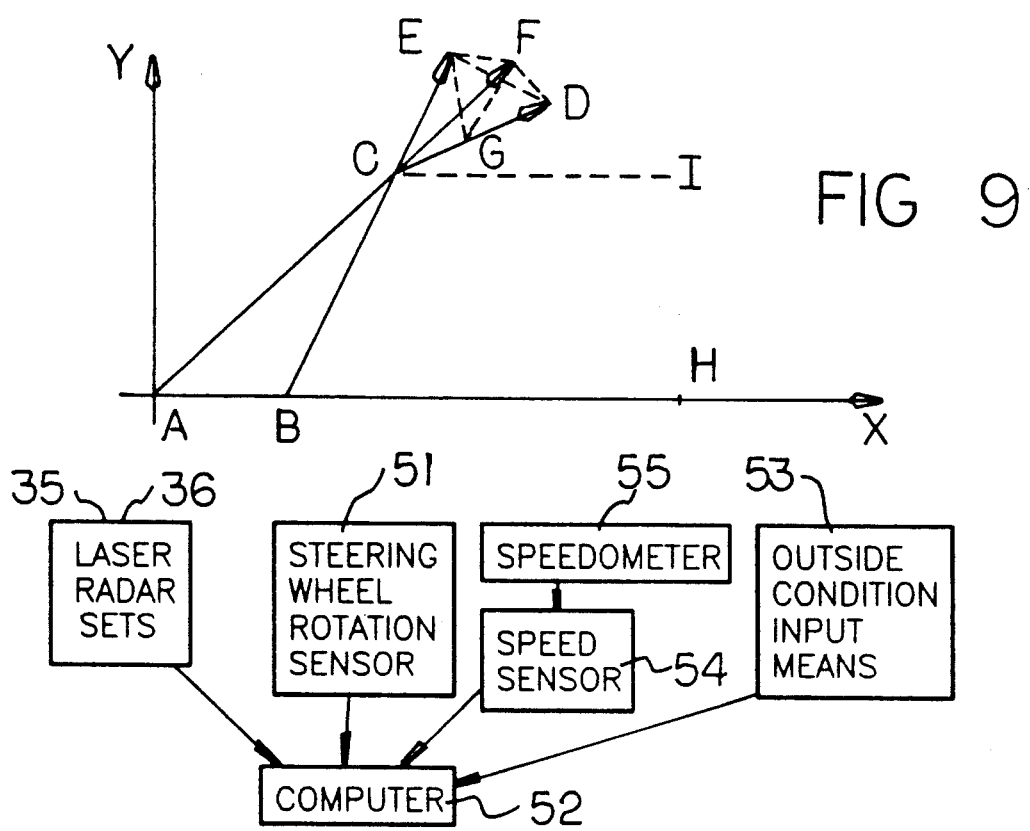
FIG. 9 illustrates a geometric and trigonometric drawing, as an example, to find the speed and the direction of movement of an obstacle.

FIG. 9 illustrates, as an example, how geometric and trigonometric principles can be used to calculate the direction of movement and the speed of the obstacle.

In FIG. 9:

Point A represents left laser radar set.

Point B represents right laser radar set.

Point A is the origin of a coordinate system,

Point B and Point H are on the positive half of X-axis.

AB is the distance between right and left laser radar sets (known).

Point C represents the obstacel's location.

Angle CAB is the direction of location of the obstacle, if Point A is used as the reference point of the system-equipped vehicle.

AC is the distance between the left laser radar set and the obstacle (measured).

BC is the distance between the right laser radar set and the obstacle (measured).

$\vec{CD}$ is a vector representing the relative speed and direction of movement of the obstacle as relative to the system-equipped vehicle.

$\vec{CF}$ is a vector representing the radial component of the relative speed of the obstacle along the direction of Line ACF, as measured by the Laser Set A, wherein Line ACF is a straight line and Angle CFD is a right angle.

$\vec{CE}$ is a vector representing another radial component of the relative speed of the obstacle along the direction of Line BCE, as measured by Laser Set B, wherein Line BCE is a straight line and Angle CED is a right angle.

Line CI is a line parallel to Line AH (X-axis).

Angle CBH is the angle of right representative laser radar beam (known).

Angle CAH is the angle of the left representative laser radar beam (known).

*Angle ACF=Angle CBH−Angle CAH.*

Angle ECF = Angle ACB.

Since CE, CF, and Angle ECF are all known, with a trigonometric principle, the Law of Cosines, EF can be calculated.

Because Angle CFD and Angle CED are both right angles, Points C, D, E, and F are all located on an imaginary circle with Point G as the center of the circle.

Therefore $$Angle\ EGE = Angle\ ECF \times 2.$$

Angle ECF = Angle ACB = Angle CBH − Angle CAH.

Triangle GEF is an equilateral triangle, therefore $$Angle\ GEF = Angle\ GFE = \tfrac{1}{2} \times (180 - Angle\ EGF)$$

With EF, Angle GEF, and Angle GFE all known, EG and GF can be calculated with another trigonometric principle, the Law of Sines.

$$CD = 2 \times EG$$

wherein CD is the speed of the obstacle.

Angle ECD can be calculated from the formula $$Cosine\ ECD \times CD = EC$$

Angle CBH = Angle ECI = Angle ECD + Angle DCI

Therefore $$Angle\ DCI = Angle\ CBH - Angle\ ECD$$

wherein Angle DCI is the direction of movement of the obstacle.

The above example demonstrates that in the second embodiment, trigonometric and geometric principles can be utilized to calculate the relative speed of the obstacle, based on the relative speed component in the radial direction as measured by the right laser radar set and the relative speed component in another radial direction as measured by the left laser radar set. The trigonometric and geometric principles can also be utilized to calculate the direction of movement of the obstacle as relative to the system-equipped vehicle, based on the information detected by the right laser radar set and the information detected by the left laser radar set.

Figure 10:
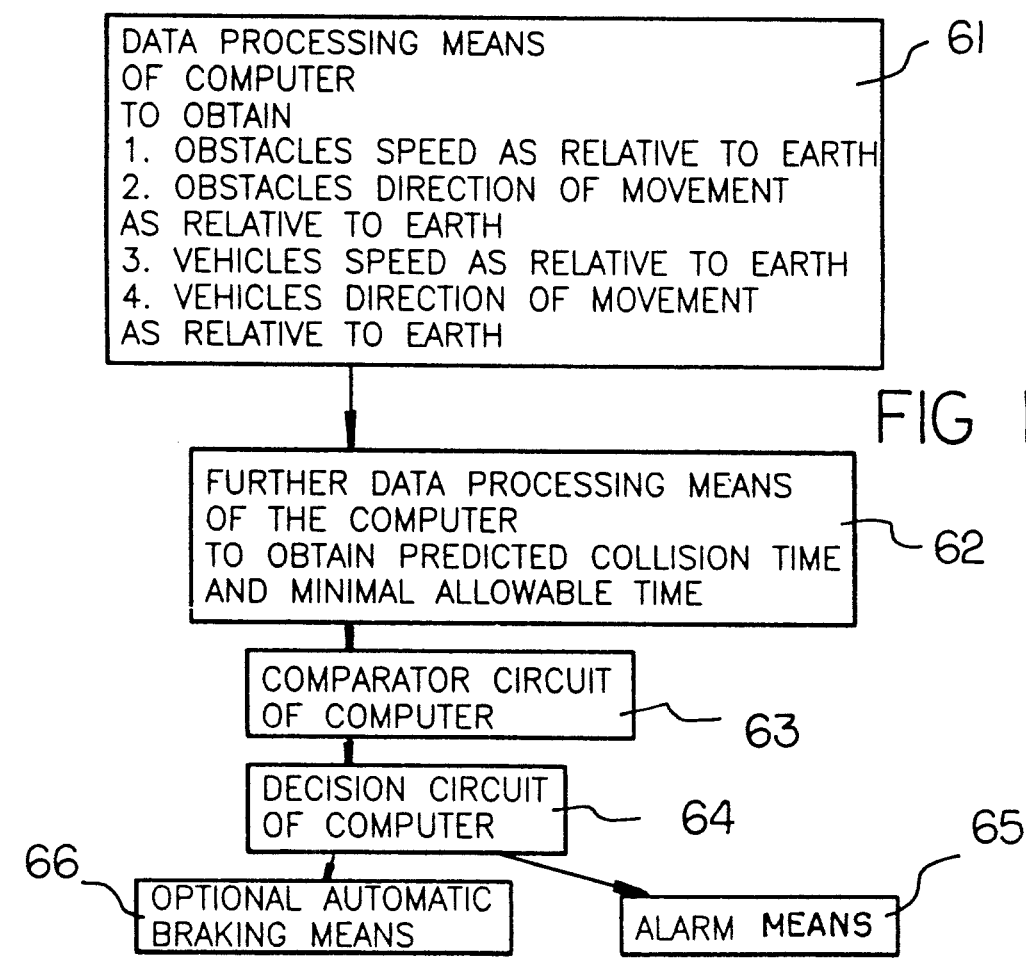
FIG. 10 is a block diagram of the second preferred embodiment of this invention.

As illustrated in FIG. 10, the right and left laser radar sets (35, 36) are functionally connected with a computer (52) in the second embodiment. The second embodiment further includes a steering wheel rotation sensor (51) which is functionally connected with the computer (52). The steering wheel rotation sensor (51) can detect the degree of rotation of the steering wheel and convert the information into electronic signals. The signals from the steering wheel rotation sensor (51) is sent to the computer (52) so that the computer can determine the direction of movement of the system-equipped vehicle.

Still referring to FIG. 10, the second embodiment further includes an outside condition input means (53) and a speed sensor (54) being connected with the vehicle's speedometer (55). The outside condition input means (53) and the said speed sensor (54) are both functionally connected with the computer (52) such that the computer will receive signals for the road condition, the light condition, the driver's condition and the vehicle speed in the same way as in the first embodiment.

The computer can also estimate the size of any obstacle detected by counting the number of laser radar beams which are reflected back by the obstacle. Since each laser radar beam is separated from the next laser radar beam by a known degree of angle, the total angular dimension of the obstacle can be estimated. The size of the obstacle can be calculated by the formulas:

Size of Obstacle = Distance × Sine function of the angular dimension or $$Size\ of\ obstacle = 2\pi \times Distance \times \frac{angular\ dimension}{360}$$

Thus, the computer in the second embodiment has a data processing means (61) to process the input signals to obtain all of the following data: the speed of any obstacle as relative to the system-equipped vehicle, the direction of movement of the obstacle as relative to the vehicle, the exact location of the obstacle including its distance and its direction, the speed of the vehicle as relative to the earth, and the direction of movement of the vehicle as relative to the earth. With these data, the data processing means (61) of the computer (52) can find out whether the obstacle is moving, and if it is moving, the computer can calculate and find out the speed of the obstacle as relative to the earth and the direction of movement of the obstacle as relative to the earth (by addition of vectors).

With the data of the obstacle's speed as relative to the earth, obstacle's direction of movement as relative to the earth, and obstacle's distance and direction of location, a further data processing means (62) of the computer can further process the data and predict the location and course of movement of the obstacle in the near future if the obstacle continues to move at its current speed and direction. Similarly, with the data of the system-equipped vehicle's direction of movement and speed as relative to the earth, the further data processing means (62) of the computer can predict the location and course of movement of the vehicle in the near future if the vehicle continues to move at its current speed and direction.

With the data of the predicted location and course of movement of the obstacle and the predicted location and course of movement of the system-equipped vehicle available, the said further data processing means (62) of the computer can determine whether there is any danger that the obstacle and the vehicle will move to a same location at a same time in the near future. Thus the computer can predict when a collision might happen if both the obstacle and the vehicle continue to move at their own current speeds and directions. Thus the further data processing means (62) of the computer in the second embodiment can determine the predicted collision time.

The minimal allowable time for the second embodiment can be obtained in a similar way as in the first embodiment. The obstacle's size ("S") and the obstacle's speed ("W") will be factors influencing the minimal allowable time, in addition to the already described factors, including system-equipped vehicle's speed ("V"), road condition ("R"), light condition ("L"), driver's condition ("D") and the degree of steered angle ("A"). The further data processing means (62) of the computer in the second embodiment will receive data for all of the factors. With these input data, either through memory matrices or through a multi-variable function "g"

$$T_{v,w,a,r,l,d,s} = g(V, W, A, R, L, D, S)$$

the computer can obtain the minimal allowable time similar to the first embodiment.

A comparator circuit (63) of the computer then compares the predicted collision time with the minimal allowable time. When the predicted collision time is shorter than the minimal allowable time, a decision circuit (64) of the computer will send a commanding signal to an alarm system (65) to actuate an audible and/or visual alarm in a similar way as the first embodiment.

As already described in the first embodiment, a plurality of safety levels may be selected in association with the minimal allowable time such that a plurality of correlated degrees of audible and/or visual alarm may be adapted.

As will be obvious to those skilled in the art, false positive alarm is usually not a problem in the collision avoidance system of the second embodiment. Thus an optional automatic braking device may be incorporated into the collision avoidance system. A plurality of designs are applicable for an automatic braking device. As an example, an automatic braking device consists of an electric pump functionally connected to the hydraulic system of a vehicle's brake system. The pump can be actuated by a braking commanding signal sent by the computer such that the hydraulic pressure in the brake system is increased to brake the vehicle.

The automatic braking device is suitable when the vehicle user is unresponsive. Referring back to FIG. 10, the decision circuit (64) of the computer further includes means to detect any response from the vehicle user within a predetermined period of time after an uppermost degree alarm has been actuated. The vehicle user's response includes any active application of any one of the accelerator, the brake or the steering wheel. A sudden change of the vehicle's speed as detected by the speed sensor (54) and the speedometer (55) exceeding a predetermined amount, or a sudden change of the vehicle's direction of movement as detected by the steering wheel rotation sensor (51) exceeding a predetermined amount constitute input information for a vehicle user's response. When the decision circuit (64) of the computer does not receive any input information for the vehicle user's response within a predetermined period of time after an uppermost degree alarm has been actuated, the decision circuit (64) will send a braking commanding signal to an optional automatic braking device (66) to actuate automatic braking of the vehicle. After a braking commanding signal has been sent out by the decision circuit (64) of the computer, reception of input information from the steering wheel rotation sensor (51) will cause the decision circuit (64) to cancel the braking commanding signal. The automatic braking device can decrease the severity of car accidents. For special purpose situations or for vehicle users who have past medical history of fainting spells, the automatic braking device may be actuated sooner, by making its activation associated with either the less serious degree alarm or the further less serious degree alarm, such that an accident may be prevented or minimized.

Besides at least two laser radar sets being mounted on the front side of a vehicle as described hereto, the second embodiment may be expanded to include at least two laser radar sets being mounted on each of the rear side, the right side or the left side of the vehicle to prevent collisions with obstacles coming from the rear, the right or the left of the vehicle, in accordance with the teachings of this invention. The optional automatic braking device is applicable only for a collision avoidance system for the front side of a vehicle. The optional automatic braking device is usually not suitable to be used in association with a collision avoidance system for the rear side, the right side or the left side of the vehicle.

The Third Preferred Embodiment

The second preferred embodiment of this invention utilizes a steering wheel rotation sensor to send the computer information about the direction of movement of a system-equipped vehicle. The advantage of a steering wheel rotation sensor is that it is relatively simple and inexpensive. The disadvantages of steering wheel rotation sensor includes a plurality of factors which can cause inaccuracy in the prediction of direction of movement of the system-equipped vehicle, wherein the factors producing inaccuracy includes wheel skidding, wheel locking, unbalanced brakes, unbalanced wheel alignment, unbalanced tire, and uneven or tilted road surfaces. Inaccuracy from wheel skidding and wheel locking will be significant because when faced with impending collision, the vehicle user often has panic steering and/or panic braking which often result in wheel skidding and/or wheel locking. Furthermore, vehicle collision often occurs on slippery roads, including wet roads, icy or snowy roads due to wheel skidding. Inaccuracy produced by uneven or tilted road surface can be difficult to avoid. The prediction of directional change based on the steering wheel rotation sensor will be partially inaccurate on a tilted road surface.

The third embodiment will utilize a laser gyroscope to measure the directional change of a system-equipped vehicle to avoid the above disadvantages of the second embodiment.

Figure 11:
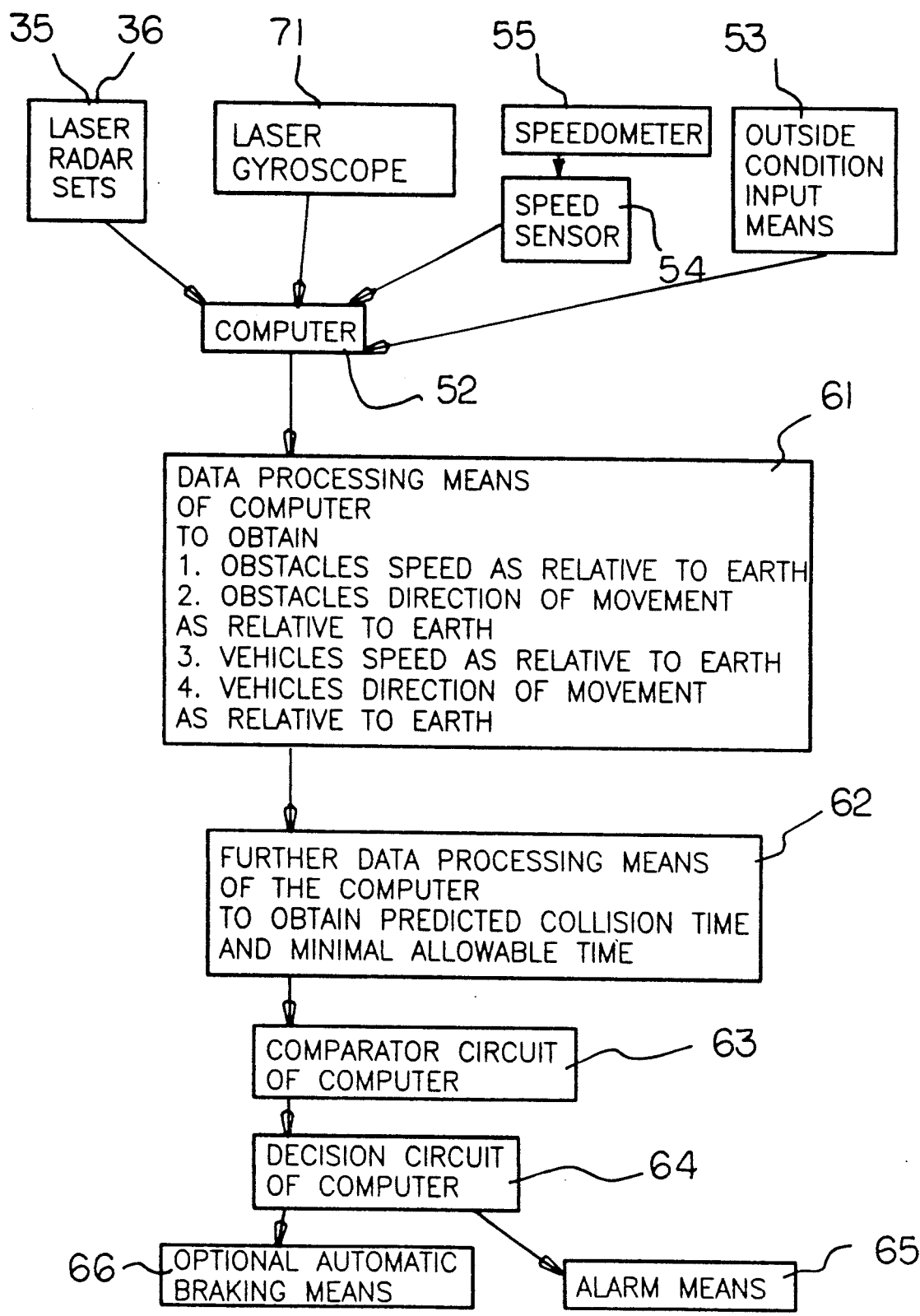
FIG. 11 is a block diagram of the third preferred embodiment of this invention.

As illustrated in FIG. 11, the third embodiment utilizes a laser gyroscope (71) to substitute for the steering wheel rotation sensor in the second embodiment. A laser gyroscope (71) is horizontally mounted on a system-equipped vehicle to detect any directional change rate of the vehicle in the horizontal plane. The laser gyroscope further includes means to process the information of the vehicle's directional change rate to determine the vehicle's direction of movement (of conventional art, detail not described hereof). The laser gyroscope (71) is functionally connected with the computer (52) to send the computer electronic signals for the direction of movement of the system-equipped vehicle. All of the other functional components, designs and operating principles of the third preferred embodiment of this invention are the same as described under the second preferred embodiment.

The Fourth Preferred Embodiment

Wheel skidding is one of the major sources of vehicle collisions and accidents. However, none of the above three preferred embodiments provide any help in detecting and correcting wheel skidding. Utilizing part of the concepts and designs of the third embodiment, a new and improved wheel skidding detecting system is hereupon disclosed.

The fourth embodiment utilizes a laser gyroscope and a steering wheel rotation sensor to create a new and improved wheel skidding detecting system. As already described in the Background Art of This Invention, a wheel skidding detecting device has been found to be very useful in a vehicle with rear wheel steering capability or a four-wheel steering vehicle.

FIG. 12 illustrates a new and improved wheel skidding detecting system. A laser gyroscope (81) is horizontally mounted on a vehicle to detect any horizontal directional change of the vehicle, and the laser gyroscope (81) can process the information to determine the actual directional change rate of the vehicle (of conventional art, detail not described hereof). The directional change rate is the degree of directonal change per second. The laser gyroscope (81) is functionally connected with a computer (82) and will send to the computer electronic signals of the actual directional change rate of the vehicle.

A steering wheel rotation sensor (83) is mounted in the vehicle and is functionally connected with the computer (82) to give the computer electronic signals about the degree of steered angle. A speed sensor (84) is functionally connected with the vehicle's speedometer (85) and the said speed sensor (84) is also functionally connected with the computer (82) such that the speed sensor (84) can send electronic signals to the computer about the vehicle's speed. The data processing means (86) of the computer will process the signals of the degree of steered angle and the signals of the vehicle's speed to determine the predicted directional change rate of the vehicle.

Depending on the vehicle's steerage design, other factors could be related to the predicted directional change rate of the vehicle. For the ordinary two-front-wheel-steering vehicles, the vehicle directional change rate is related to the steering wheel rotated angle and the vehicle speed. Whereas, for vehicles with four-wheel-steerage, the predicted vehicle directional change rate is related to the sum of the front wheel steered angle plus the rear wheel steered angle and the vehicle speed, wherein the rear wheel steered angle is considered positive when in the reverse-phase direction and considered negative when in coincidence-phase direction. For most of the four-wheel steering vehicles, the rear wheels are steered indirectly, depending on the vehicle speed and/or steering wheel angle and/or steering wheel rotating speed. Thus, for these types of four-wheel steering vehicles, all of the pertinent factors related to the rear wheel steerage and front wheel steerage should be included in the calculation to obtain the data of predicted directional change rate of the vehicle. This can be done easily for any particular type of rear wheel steerage because all of the pertinent sensors, including sensors for vehicle speed and/or steering wheel angle and/or steering wheel rotating speed and/or others should be already present. All of the pertinent sensors can be functionally connected to the computer of this embodiment for the computer (82) to calculate the predicted directional change rate.

The computer also includes a comparator circuit (87) and the comparator circuit will compare the said actual directional change rate of the vehicle with the said predicted directional change rate of the vehicle A discrepancy between the actual directional change rate and the predicted directional change rate exceeding a predetermined amount will indicate the presence of wheel skidding. The comparator circuit (87) of the computer can further process the magnitude, and positivity or negativity of the discrepancy between the actual and the predicted directional change rates to determine the magnitude and direction of wheel skidding. The comparator circuit (87) of the computer can further generate electronic signals for the presence, magnitude and direction of wheel skidding and the electronic signals are sent to a decision circuit (88) of the computer. The decision circuit (88) of the computer can generate an output electronic signal to be sent to a vehicle control means (89) to actuate an appropriate response or combination of responses.

This new and improved wheel skidding detecting system can be utilized with various vehicle control means (89), including designs to adjust vehicle acceleration, vehicle steering, vehicle braking, vehicle transmission or various combinations of them. The output electronic signals about wheel skidding from the decision circuit (88) of the computer are sent to the various vehicle control means to actuate a response or responses to alleviate or correct the wheel skidding. The nature and the ways the various vehicle control means can respond to the output signals about wheel skidding depend on the various models and designs of the vehicles.

As described in the Background Art of This Invention, one example of the said vehicle control means (89) capable of responding to wheel skidding is a rear wheel steering angle adjusting device (90) for a four wheel steering vehicle. The electronic output signals about wheel skidding are sent to the rear wheel steering angle adjuster (90) to adjust the steered angle of the rear wheels to alleviate or correct the wheel skidding.

The vehicle control means also includes a vehicle transmission adjusting means(92)(conventional art, detail not described). Upon receipt of the said electronic output signals about wheel skidding, the transmission adjusting means (92) will automatically adjust the transmission to lower gears to alleviate the wheel skidding.

For vehicles with dual mode two-wheel drive/four-wheel drive system, the vehicle control means includes a vehicle transmission adjusting means and a vehicle driveline adjusting means. Upon receipt of the output signals about wheel skidding, said transmission adjusting means will automatically shift the transmission to lower gears, and said driveline adjusting means will automatically adjust the driveline to four-wheel drive mode.

The vehicle control means further includes a vehicle engine deceleration means(91)(conventional art, detail not described). Upon receipt of said output signals about wheel skidding, said deceleration means will automatically decelerate the engine to alleviate wheel skidding.

With respect to the above description, it should be realized that the optimum dimensional relationships for the parts of the invention, to include variation in size, materials, shapes, form, function and manner of operation, assembly and use, are deemed readily apparent and obvious to those skilled in the art, and therefore, all relationships equivalent to those illustrated in the drawings and described in the specification are intended to be encompassed only by the scope of appended claims While the present invention has been shown in the drawings and fully described above with particularity and detail in connection with what is presently deemed to be the most practical and preferred embodiments of the invention, it will be apparent to those of ordinary skill in the art that many modifications thereof may be made without departing from the principles and concepts set forth herein. Hence, the proper scope of the present invention should be determined only by the broadest interpretation of the appended claims so as to encompass all such modifications and equivalents.

We claim:

1. A collision avoidance system for a roadway vehicle comprising:
    at least one laser radar unit being mounted on at least one of the vehicle's four sides, including the front side, rear side, right side or left side, wherein each laser radar unit includes:
    a transmitter means for transmitting laser radar signals;
    a highly directional receiver means for receiving reflected laser radar signals by an obstacle from the said transmitted laser radar signals, and generating a first electronic signal thereof;
    means for processing said first electronic signal to determine the distance and relative speed in radial direction of said detected obstacle as relative to said vehicle, and generating a second electronic signal representing said detected distance and said detected relative speed thereof;
    a steering wheel rotation sensor for determining the degree of steering angle and generating a third electronic signal thereof;
    an outside condition input means with a plurality of night light selector, and a driver's condition selector, wherein the selectors can be either manually selected by the vehicle user or automatically selected by branch circuits from the windshield wiper and the headlight, to match the ongoing road condition, light condition and driver's condition respectively, and the selectors can generate fourth, fifth and sixth electronic signals representing the ongoing road condition, light condition and driver's condition respectively;
    a speed sensor functionally connected with a speedometer, wherein the speed sensor can generate a seventh electronic signal for the system-equipped vehicle's speed;
    a computer receiving input information from the first, second, third, fourth, fifth, sixth and seventh electronic signals, wherein the computer can process the received information and determine when a collision is imminent; and
    alarm means functionally connected to the computer for producing an alarm upon receipt of a signal from the computer indicating a determination by the computer that a collision is imminent.

2. The collision avoidance system of claim 1, wherein one or a plurality of laser radar units are evenly separated from each other and are mounted on the front side of the vehicle and directed straight forward; at least one laser radar unit is mounted on at least one of the right side of the vehicle, the left side of the vehicle and the rear side of the vehicle; all of the said laser radar units being fixedly mounted with a predetermined scanning range.

3. The collision avoidance system of claim 1, wherein at least one laser radar unit is mounted on a rotatable structure and the rotatable structure is fixedly mounted on at least one of the four sides of the vehicle; the rotatable structure being rotated by an electric motor clockwise and counterclockwise back and forth through a small predetermined angle to allow the laser radar unit to scan a narrow band of predetermined scanning zone; or alternatively, the rotatable structure being rotated in one direction while the laser radar being emitting periodically to allow the laser radar to scan a narrow band of predetermined scanning zone.

4. The collision avoidance system of claim 1, wherein the computer includes means for processing the information from the second electronic signal to determine a predicted collision time related to the detected obstacle by dividing the detected distance by the said detected relative speed; and the computer further includes means for processing the information from the second, third, fourth, fifth, sixth and seventh electronic signals to determine a minimal allowable time either by utilizing a predetermined multi-variable function with the function's variables including at least the relative speed of obstacle, speed of system-equipped vehicle, degree of steering angle, road condition, light condition and driver's condition, or by selectively reading a plurality of pre-stored memory matrices each storing information of minimal allowable time for a particular set of input variables.

5. The collision avoidance system of claim 4, wherein the computer includes means for comparing the predicted collision time with the minimal allowable time; and the computer also includes means for generating an uppermost stage of commanding signal when the predicted collision time is shorter than the minimal allowable time; and the computer further includes means for further generating a plurality of stages of less critical commanding signals when the predicted collision time is shorter than the minimal allowable time plus a plurality of predetermined periods of time; whereupon the commanding signals are sent to the alarm means to actuate an uppermost degree of alarm upon receipt of an uppermost stage of commanding signal, and to actuate a plurality of degrees of a less serious alarm upon receipt of a plurality of correlating stages of less critical commanding signals.

6. A collision avoidance system for a roadway vehicle comprising:
    at least two laser radar sets being mounted on at least one of the vehicle's four sides including the front side, rear side, right side or left side, wherein on each of an equipped side, at least one laser radar set being mounted near one end of the equipped side and at least another set being mounted near the other end of the equipped side of the vehicle, each laser radar set including at least one laser radar unit, said laser radar unit including:
    a transmitter means for transmitting laser radar signals;
    a highly directional receiver means for receiving reflected laser radar signals by an obstacle from the transmitted laser radar signals and generating a first electronic signal thereof;
    means for processing the first electronic signal to determine the distance of the obstacle and the radial component of the relative speed along the laser beam direction of the obstacle as relative to the vehicle, and generating a second electronic signal for the detected distance and the radial component of the relative speed;
    an angle encoder or an angle sensor functionally connected with each laser radar unit, wherein the angle encoder or angle sensor can generate a third electronic signal for the direction of the associated laser radar unit at a same time when the laser radar unit receives reflected signals, said third electronic signal being indicative of the direction of location of the detected obstacle;

a steering wheel rotation sensor for determining the degree of steering angle and the direction of movement of the vehicle as relative to the earth to generate a fourth electronic signal for the vehicle's direction of movement;

an outside condition input means with a plurality of selectors including road condition selector, day or night light selector, and driver's condition selector, wherein the selectors can be either manually selected by the vehicle user or automatically selected by branch circuits from the windshield wiper and the headlight, to match the ongoing road condition, light condition, and driver's condition respectively, and the selectors can generate fifth, sixth and seventh electronic signals representing the ongoing road condition, light condition and driver's condition respectively;

a speed sensor functionally connected with a speedometer, wherein the speed sensor can generate an eighth electronic signal representing the system-equipped vehicle's speed as relative to the earth;

a computer receiving information from the first, second, third, fourth, fifth, sixth, seventh and eighth electronic signals, wherein the computer can process the received information and determine when a collision is imminent;

alarm means functionally connected to the computer for producing an alarm upon receipt of a signal from the computer indicating a determination by the computer that a collision is imminent; and an optional automatic braking means functionally connected with the computer, to be actuated by the computer after a predetermined waiting period of time following the actuation of the alarm means, and to be rendered unactivable or be deactivated by the computer either when the computer detects a change of the fourth electronic signal exceeding a predetermined amount after the actuation of the alarm means, or when the computer detects a change of the eighth electronic signal exceeding a predetermined amount within the waiting period.

7. The collision avoidance system of claim 6, wherein each laser radar set includes a plurality of laser radar units evenly separated angularly and arrayed on a semicircular disc with each laser radar unit directed at a predetermined direction such that the laser radar set can scan a 180 degree semicircular zone, the radius of the semicircular zone being a predetermined range of each laser radar unit, said predetermined direction of each laser radar unit being encoded by each associated angle encoder.

8. The collision-avoidance system of claim 6, wherein each laser radar set includes at least one laser radar unit mounted on a rotatable structure, said rotatable structure being rotated by an electric motor through at least 180 degrees such that the said laser radar unit can scan a 180 degree semicircular zone, said laser radar unit being capable of emitting laser radar beams intermittently at detectable or predetermined emitting angles, and the associated angle sensor being capable of generating the third electronic signal for the direction of the laser radar beam at each emitting angle.

9. The collision avoidance system of claim 7, wherein the computer includes means to process the second and the third electronic signals from the at least two laser radar sets to determine the direction of movement and the speed of the obstacle as relative to the system-equipped vehicle and thereby to generate a ninth electronic signal for the direction of movement of the obstacle, and a tenth electronic signal for the relative speed of the obstacle; and the computer also includes means to estimate the size of the obstacle by counting the number of laser radar beams being reflected back by the obstacle to generate an eleventh electronic signal for the size of the obstacle thereof; and the computer further includes means to process the second, third, fourth, eighth, ninth and tenth electronic signals to determine the speed and direction of movement of the obstacle as relative to the earth and to generate a twelfth electronic signal for the speed of obstacle as relative to the earth, and a thirteenth electronic signal for the direction of movement of the obstacle as relative to the earth.

10. The collision avoidance system of claim 9, wherein the computer includes means to process the information received from the second, third, fourth, eighth, twelfth and thirteenth electronic signals to predict the locations and courses of movement of the vehicle and the obstacle respectively, and thereby to determine a predicted collision time if both the vehicle and the obstacle continue to move at their own current speeds and directions; and the computer further includes means to process the fourth, fifth, sixth, seventh, eighth, eleventh and twelfth electronic signals to determine a minimal allowable time, either by utilizing a predetermined multi-variable function with the function's variables including at least the vehicle's degree of steering angle, road condition, light condition, driver's condition, vehicle's speed as relative to earth, obstacle's size, and speed of obstacle as relative to earth, or by selectively reading a plurality of pre-stored memory matrices each storing information of minimal allowable time for a particular set of input variables.

11. The collision avoidance system of claim 10, wherein the computer includes means for comparing the predicted collision time with the minimal allowable time; and the computer also includes means for generating an uppermost stage of commanding signal when the predicted collision time is shorter than the minimal allowable time; and the computer further includes means for further generating a plurality of stages of less critical commanding signals when the predicted collision time is shorter than the minimal allowable time plus a plurality of predetermined periods of time; whereupon the commanding signals are sent to the alarm means to actuate an uppermost degree of alarm upon receipt of an uppermost stage of commanding signal, and to actuate a plurality of degrees of a less serious alarm upon receipt of a plurality of correlating stages of less critical commanding signals.

12. The collision avoidance system of claim 8, wherein the computer includes means to process the second and the third electronic signals from the at least two laser radar sets to determine the direction of movement and the speed of the obstacle as relative to the system-equipped vehicle and thereby to generate a ninth electronic signal for the direction of movement of the obstacle, and a tenth electronic signal for the relative speed of the obstacle; and the computer also includes means to estimate the size of the obstacle by counting the number of laser radar beams being reflected back by the obstacle to generate an eleventh electronic signal for the size of the obstacle thereof; and the computer further includes means to process the second, third, fourth, eighth, ninth and tenth electronic signals to determine the speed and direction of movement of the obstacle as relative to the earth and to generate a twelfth electronic signal for the speed of the obstacle as relative to the earth, and a thirteenth electronic signal for the direction of movement of the obstacle as relative to the earth 13. The collision avoidance system of claim 12, wherein the computer includes means to process the information received from the second, third, fourth, eighth, twelfth and thirteenth electronic signals to predict the locations and courses of movement of the vehicle and the obstacle respectively, and thereby to determine a predicted collision time if both the vehicle and the obstacle continue to move at their own current speeds and directions; and the computer further includes means to process the fourth, fifth, sixth, seventh, eighth, eleventh and twelfth electronic signals to determine a minimal allowable time, either by utilizing a predetermined multi-variable function with the function's variables including at least the vehicle's degree of steering angle, road condition, light condition, driver's condition, vehicle's speed as relative to earth, obstacle's size, and speed of obstacle as relative to earth, or by selectively reading a plurality of pre-stored memory matrices each storing information of minimal allowable time for a particular set of input variables.

14. The collision avoidance system of claim 13, wherein the computer includes means for comparing the predicted collision time with the minimal allowable time; and the computer also includes means for generating an uppermost stage of commanding signal when the predicted collision time is shorter than the minimal allowable time; and the computer further includes means for further generating a plurality of stages of less critical commanding signals when the predicted collision time is shorter than the minimal allowable time plus a plurality of predetermined periods of time; whereupon the commanding signals are sent to the alarm means to actuate an uppermost degree of alarm upon receipt of an uppermost stage of commanding signal, and to actuate a plurality of degrees of less serious alarm upon receipt of a plurality of correlating stages of less critical commanding signals.

15. The collision avoidance system of claim 11, wherein the system includes a laser gyroscope horizontally mounted on the system-equipped vehicle to detect any directional change rate of the vehicle in the horizontal plane; and the system further includes means to process the information of the vehicle directional change rate to determine the vehicle's direction of movement and to generate a fourteenth electronic signal for the vehicle's direction of movement; said fourteenth electronic signal being sent to and being utilized by the computer to substitute for the information of the vehicle's direction of movement from the fourth electronic signal.

16. The collision avoidance system of claim 14, wherein the system includes a laser gyroscope horizontally mounted on the system-equipped vehicle to detect any directional change rate of the vehicle in the horizontal plane; and the system further includes means to process the information of the vehicle directional change rate to determine the vehicle's direction of movement and to generate a fourteenth electronic signal for the vehicle's direction of movement; said fourteenth electronic signal being sent to and being utilized by the computer to substitute for the information of the vehicle's direction of movement from the fourth electronic signal.

17. A wheel skidding detecting system for a roadway vehicle comprising:

a laser gyroscope horizontally mounted on the vehicle to detect any horizontal directional change rate of the vehicle and to generate a first electronic signal for the actual directional change rate of the vehicle;

a speed sensor functionally connected with a speedometer, wherein the speed sensor can generate a second electronic signal for the vehicle's speed;

a steering wheel rotation sensor for determining the degree of steered angle and the direction of movement of the vehicle, wherein the steering wheel rotation sensor can generate a third electronic signal for the direction of movement of the vehicle;

a computer receiving information of the first, second and third electronic signals, wherein the computer includes means to process the second and the third electronic signals to determined a predicted directional change rate of the vehicle; and the computer also includes means to calculate a discrepancy between the actual directional change rate and the predicted directional change rate and to determine the presence of wheel skidding based on the magnitude of the discrepancy exceeding a predetermined amount, with the magnitude, positivity or negativity of the discrepancy being correlated with the severity and direction of the wheel skidding; and the computer further includes means to generate electronic output signals for the presence, magnitude and direction of wheel skidding thereof; and a vehicle control means receiving the electronic output signals for the presence, magnitude and direction of wheel skidding, wherein the vehicle control means includes various means to respond to the electronic output signals by adjusting at least one of the vehicle acceleration, vehicle steering, vehicle braking, vehicle transmission and other designs related to vehicle control; said vehicle control means being actuated or deactivated by the presence or the absence of said electronic output signals respectively.

18. The wheel skidding detecting system of claim 17, wherein the vehicle is one of a four wheel steering vehicle and a vehicle with rear wheel steering capability, and the vehicle control means includes at least a rear wheel steering angle adjusting means for adjusting the steered angle of rear wheels to alleviate or correct the wheel skidding.

19. The wheel skidding detecting system of claim 17, wherein the vehicle control means includes at least a vehicle engine deceleration means to automatically decelerate the vehicle engine to alleviate or correct the wheel skidding.

20. The wheel skidding detecting system of claim 17, wherein the said vehicle control means includes at least a vehicle transmission adjusting means to automatically adjust the transmission to lower gears to alleviate or correct the wheel skidding in a front wheel drive vehicle or a rear wheel drive vehicle; and the vehicle control means further includes at least a vehicle transmission adjusting means to automatically adjust or shift the transmission to lower gears and a driveline adjusting means to automatically adjust the driveline into all wheel drive mode in a vehicle with dual mode two-wheel drive and four-wheel drive capability, to alleviate or correct wheel skidding.

* * * * *

UNITED STATES PATENT AND TRADEMARK OFFICE
CERTIFICATE OF CORRECTION

PATENT NO. : 5,314,037  
DATED : May 24, 1994  
INVENTOR(S) : David C.-H. Shaw; Judy Z.-Z. Shaw.

Page 1 of 2

It is certified that error appears in the above-indentified patent and that said Letters Patent is hereby corrected as shown below:   On drawing sheet In Figure 10, within the box of DATA PROCESSING MEANS (61):  
delete "1. OBSTACLES" and substitute --1. OBSTACLE'S--;  
delete "2. OBSTACLES" and substitute --2. OBSTACLE'S--;  
delete "3. VEHICLES" and substitute --3. VEHICLE'S--;  
delete "4. VEHICLES" and substitute --4. VEHICLE'S--;  
draw an arrow from COMPUTER (52) to DATA PROCESSING MEANS (61).

In Figure 11, within the box of DATA PROCESSING MEANS (61):  
delete "1. OBSTACLES" and substitute --1. OBSTACLE'S--;  
delete "2. OBSTACLES" and substitute --2. OBSTACLE'S--;  
delete "3. VEHICLES" and substitute --3. VEHICLE'S--;  
delete "4. VEHICLES" and substitute --4. VEHICLE'S--.

Column 2, line 48, delete "direction also" and substitute --direction, also--;

Column 8, line 56, delete "by" and substitute --be--;  
Column 10, line 25, delete "30";

UNITED STATES PATENT AND TRADEMARK OFFICE
CERTIFICATE OF CORRECTION

PATENT NO. : 5,314,037
DATED     : May 24, 1994
INVENTOR(S): David C.-H. Shaw; Judy Z.-Z. SHAW It is certified that error appears in the above-indentified patent and that said Letters Patent is hereby corrected as shown below:

Column 10, line 26, delete
"is located" and substitute --is partially limited when dealing with an obstacle which is located--;
Column 12, line 68, delete "ACF" and substitute --ACB--;
Column 13, line 13, delete "EGE" and substitute --EGF--;
Column 17, line 67, delete "vehicle A" and substitute --vehicle. A--.

Column 19, calim 1, line 32, after "of" add
--selectors, including a road condition selector, a day or--.

Signed and Sealed this

Twenty-seventh Day of September, 1994

Attest:

BRUCE LEHMAN

Attesting Officer

*Commissioner of Patents and Trademarks*